Figure 1:
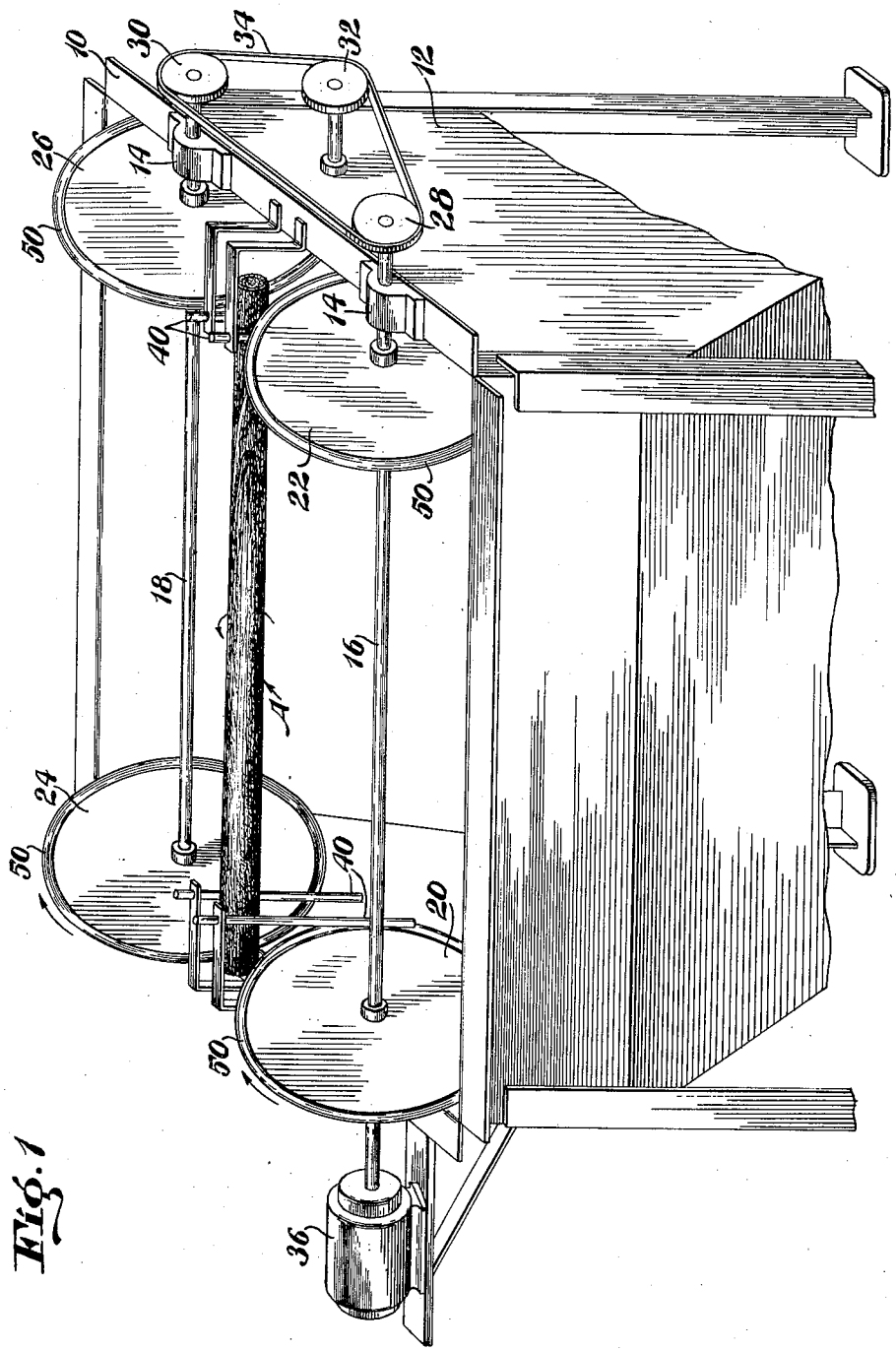

Aug. 13, 1940.  G. S. RIPPEY ET AL  2,211,351
METHOD OF SEPARATING LEAF SHEATHS
Filed April 28, 1939

INVENTORS
George S. Rippey
BY Hartley Rowe
Rowland V. Patuck
ATTORNEY

Patented Aug. 13, 1940

2,211,351

UNITED STATES PATENT OFFICE 2,211,351

METHOD OF SEPARATING LEAF SHEATHS

George S. Rippey, Boston, and Hartley Rowe, Newton Center, Mass., assignors to United Fruit Company, Boston, Mass., a corporation of New Jersey Application April 28, 1939, Serial No. 270,504

10 Claims. (Cl. 19—5)

This invention relates to the preparation of long vegetable fibers for market from natural vegetable stalks, and is concerned particularly with the step of breaking down so-called "false" stalks into separate units which can be individually handled during the subsequent operation of cleaning the desired fibers from pulpy and other undesired material included in the original content of the unit.

The invention has been found especially suitable in the preparation of "manila" fiber for market from stalks of the abacá plant, although the invention is equally adapted for use in the breaking down of other stalks which have similar natural formation. The nature of the abacá plant and the distribution of fibers therein is well known to those acquainted with the industry, and reference is made to the description thereof contained in Bulletin No. 1 of the Fiber Standardization Board of the Department of Agriculture and Natural Resources of the Government of the Philippine Islands, entitled "The Standard Grades of Abacá," by M. M. Saleeby, Manila, Bureau of Printing, 1930. As therein fully described, the commercially desirable fibers are found in the leaf sheaths which form the stalk of the plant. The stalk is known botanically as a "false" stalk because it comprises, in the fully grown plant, a group of overlapping, crescent-shaped sheaths, laid tightly one upon another over a central core. Each leaf sheath contains the desired fibers extending substantially parallel to each other longitudinally of the sheath along its natural exterior section.

Heretofore, after the stalk has been cut down and the branches and leaves removed, the stalk has customarily been broken down into units of a size and form suitable for the subsequent cleaning operation by one of two methods. One method involves separating an outside individual leaf sheath manually from the remainder of the stalk by starting an end or edge of the sheath with a sharp blade or pointed instrument, and then stripping the sheath from the rest of the stalk.

Another commonly used method involves starting a narrow width of the outer section only of an outside individual sheath with a sharp blade or pointed instrument, and manually stripping off from the sheath what is known as a "tuxy." After the entire outer section of one leaf sheath has been removed or "tuxied," the underlying interior pulpy section, which makes up the remainder of the sheath, is removed from the rest of the stalk, and then the operation is repeated on the next leaf sheath. This latter "tuxying" operation is used especially when the stalk is being prepared for a subsequent cleaning operation by manually passing the "tuxy" under a rigid knife blade spring- or weight-pressed against a block.

These manual separating operations are usually done in the field, and are highly time consuming and inefficient.

The primary object of our invention is the provision of a machine method of separating the individual leaf sheaths which make up the false stalk with efficiency and dispatch, and to this end we have discovered that the adherence of leaf sheaths of this character is such that they may be successfully separated successively from the remainder of the stalk, by subjecting the sheaths to centrifugal forces which can be attained well within efficient and practical rotary speeds.

Apparatus for imparting centrifugal forces of this intensity to the individual leaf sheaths is illustrated in the accompanying drawing, which is an isometric view of a preferred form of the apparatus, with parts of the frame broken away.

As indicated by the reference numerals, we provide a frame 10, supporting a suitable hopper-like receptacle 12, which may, if desired, have a longitudinal central opening at the bottom.

Journalled in four bearings 14, two at each end of the machine, are two parallel shafts 16 and 18. Each shaft has a pair of rotary elements fixedly mounted thereon. Thus, shaft 16 has disks 20 and 22, and shaft 18, disks 24 and 26, all of equal diameter. As shown, disks 20 and 24 are spaced from each other, but are mounted in substantially the same plane, while disks 22 and 26 are likewise mounted in spaced relation in a different plane at the other end of the machine. The four bearings 14 may if desired be mounted for adjustment towards and away from each other laterally of the machine, so that the spaces between the paths of rotation of the rotary elements may be varied.

The shafts 16 and 18 are connected by power transmission means, which, in the drawing, take the form of pulleys 28 and 30, idler pulley 32, and belt 34, for rotation in synchronism in the same direction about their respective axes.

Driving means, such as a conventional electric motor 36, may be coupled to either one of the shafts, illustrated in the drawing as being shaft 16. Preferably the motor is of that type which is provided with automatic braking means, operable upon interruption of the current supplied to the motor, to cause the shafts to come to a rapid, complete stop.

In operation of this apparatus, a false stalk A, having been cut transversely to a predetermined suitable length, is positioned, as shown, between the converging surfaces of the rotary elements, where it is freely held under the influence of gravity. Upon supplying power, if the rotary elements are rotated in a clockwise direction, as indicated in the drawing by arrows, they will cause an opposite or counterclockwise rotation of the stalk A, due to the frictional rotational influence of the rotary elements.

In order to aid in keeping the stalk from riding up the periphery of a rotary element, suitable guards may be mounted on the frame in such positions as desired. The drawings illustrate at 40 one form of guard, of like construction at both ends of the apparatus. The relatively large diameters of the rotary elements in contrast to that of the stalk is also of some consequence as an aid in controlling the stalk during its rotation by preventing lateral swing if the stalk does ride up on one periphery.

As an aid to the proper driving of the stalk A, we have provided the rotary elements with rubber peripheral surfaces in the form of pneumatic tires, similar to bicycle tires, and indicated in the drawings by the reference 50. Moreover, these tires tend to compensate for irregularities in the surface of the stalk operated upon and provide a cushion surface which tends to prevent bouncing of the stalk. Suitable pressure may be maintained in the tires depending upon particular conditions of use.

In use of our apparatus, we have found it convenient to employ rotary elements having a 3-foot diameter, and the electric motor has been designed to drive the rotary elements at approximately 300 R. P. M., thereby imparting a peripheral speed of approximately 900 pi feet per minute. If, therefore, the stalk initially has a diameter of 8 inches at the point of contact with the rotary elements, the stalk will rotate at 1350 R. P. M., disregarding slippage. As the stalk decreases in diameter, with the successive throwing off of its outer sheaths, its R. P. M. will obviously increase, if the rotary elements maintain a constant speed. For instance, as the stalk decreases from 8 inches to 3 inches in diameter, the R. P. M. of the stalk will increase from 1350 R. P. M. to 3600 R. P. M., the peripheral speed remaining theoretically at 900 pi feet per minute. It is of course true that one end of the stalk is likely to be of somewhat smaller diameter than the other end, but the slight difference does not materially affect the operation even when all the rotary elements are driven at uniform speed.

We have found that such stalk speeds provide centrifugal force sufficient or in excess of that necessary to separate the outside leaf sheaths, one after another. This force can be expressed as being in the range of between 28.42 $rw$ pounds and 255.78 $rw$ pounds, where $r$ represents the distance in inches from the axis of rotation of the stalk to the center of gravity of the individual leaf sheath to be separated, and $w$ represents the weight in pounds of the individual leaf sheath to be separated. The force varies of course as each outside sheath becomes torn away due to the decrease in the value of $r$, and the increase in the R. P. M. of the stalk.

It is obvious that the dimensions of the apparatus, including the diameter of the rotary elements, may be changed as desired. However, it is desirable to keep the contact faces of the rotary elements relatively narrow in axial dimension so that the strips will be completely freed from the remainder of the stalk as they are thrown off. Also, we have found it convenient to supply a hood (not shown) over the machine to prevent the separated sheaths from unruly flying. The spacing of the rotary elements may be such as to permit the stalk to pass therebetween after sufficient of the sheaths have been separated to reduce the diameter of the stalk to say about 1½ inches. The core of the stalk is thus automatically disposed of after the sheaths containing the commercially desirable fibers have been separated by dropping down between the rotary elements, and the motor is thereupon shut off to permit positioning of the next stalk to be separated.

It is likewise obvious that slippage occurs in the driving action between the rotary elements and the stalk, so that the driving speeds of the rotary elements will have to be controlled to impart such speeds of rotation to the stalk as will provide the centrifugal force necessary to separate the outside leaf sheath initially, and successive outside sheaths thereafter. In the following claims, therefore, reference is made to the centrifugal force necessary, in accordance with the formula $F = .00002842\ N^2 rw$, where F represents the centrifugal force in pounds, N represents the R. P. M. of the stalk, $w$ represents the weight in pounds of the leaf sheath unit to be separated, and $r$ represents the distance in inches from the axis of rotation of the stalk to the center of gravity of the leaf sheath unit to be separated.

We claim:

1. The method of separating individual leaf sheath units of a false stalk of vegetable matter having a diameter not greater than 1 foot, including the step of rotating the stalk at a speed in excess of 900 R. P. M., whereby said units are successively separated from the remainder of the stalk under centrifugal action.

2. The method of separating individual leaf sheath units of a natural false stalk of vegetable matter, including the step of rotating the stalk at a speed between approximately 1500 and 3000 R. P. M., whereby said units are successively separated from the remainder of the stalk under centrifugal action.

3. The method of separating individual leaf sheath units of a false stalk of vegetable matter, including the step of rotating the stalk at a peripheral speed in excess of 1000 pi $d$ feet per minute, where $d$ represents the greatest diameter of the stalk in feet, whereby said units are successively separated from the remainder of the stalk under centrifugal action.

4. The method of separating a leaf sheath unit of a natural false stalk of vegetable matter, including the step of subjecting an outside individual leaf sheath unit adherent to the remainder of the stalk to a centrifugal force in excess of 28.42 pounds.

5. The method of separating a leaf sheath unit of a natural false stalk of vegetable matter, including the step of subjecting an outside individual leaf sheath unit adherent to the remainder of the stalk to a centrifugal force in the order of 150 pounds.

6. The method of separating a leaf sheath unit of a natural false stalk of vegetable matter, including the step of subjecting an outside individual leaf sheath unit adherent to the remainder of the stalk to a centrifugal force in excess of 85.26 $w$ pounds, where $w$ represents the weight in pounds of the unit to be separated.

7. The method of separating a leaf sheath unit of a natural false stalk of vegetable matter, including the step of subjecting an outside individual leaf sheath unit adherent to the remainder of the stalk to a centrifugal force in excess of 28.42 $rw$ pounds, where $r$ represents ½ the greatest diameter in inches of the stalk and $w$ represents the weight in pounds of the unit to be separated.

8. The method of separating individual leaf sheath units of a length of natural false stalk of vegetable matter, including the steps of gravitationally depositing a length of the natural stalk between downwardly converging surfaces of spaced rotary elements and subjecting the stalk to the frictional rotational influence of said surfaces as they revolve in the same direction about their respective axes at peripheral speeds between approximately 1500 pi $d$. and 3000 pi $d$. feet per minute, where $d$ represents the greatest diameter of said stalk length in feet.

9. The method of separating individual leaf sheath units of a length of natural false stalk of vegetable matter, including the steps of gravitationally depositing a length of the natural stalk between downwardly converging surfaces of spaced rotary elements, and subjecting the stalk to the frictional rotational influence of said surfaces as they revolve in the same direction about their respective axes at peripheral speeds between approximately 800 pi and 1000 pi feet per minute.

10. The method of separating individual leaf sheath units of a length of natural false stalk of vegetable matter, including the steps of cutting the natural stalk transversely to a predetermined length, gravitationally depositing said length between downwardly converging surfaces of spaced rotary elements, and subjecting the stalk to the frictional rotational influence of said surfaces as they revolve in the same direction about their respective axes at peripheral speeds in the order of 900 pi feet per minute.

HARTLEY ROWE.
GEORGE S. RIPPEY.